(12) United States Patent
Affentranger, Jr.

(10) Patent No.: US 11,824,483 B1
(45) Date of Patent: *Nov. 21, 2023

(54) SINGLE-PIECE HINGED CLAMP FOR TRACK MOUNTING ASSEMBLIES

(71) Applicant: Sunrun Inc., San Francisco, CA (US)

(72) Inventor: Martin John Affentranger, Jr., Paso Robles, CA (US)

(73) Assignee: Sunrun Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,409

(22) Filed: Jan. 18, 2023

Related U.S. Application Data

(60) Continuation of application No. 17/889,957, filed on Aug. 17, 2022, now Pat. No. 11,575,345, which is a
(Continued)

(51) Int. Cl.
*H02S 20/23* (2014.01)
*F24S 25/30* (2018.01)
*H02S 30/10* (2014.01)
*F24S 25/00* (2018.01)
*F16J 15/10* (2006.01)
(Continued)

(52) U.S. Cl.
CPC ............. *H02S 20/23* (2014.12); *F16J 15/104* (2013.01); *F24S 25/00* (2018.05); *F24S 25/30* (2018.05); *H02S 30/10* (2014.12); *F24S 25/61* (2018.05); *F24S 2025/015* (2018.05); *F24S 2025/021* (2018.05); *F24S 2025/6003* (2018.05);
(Continued)

(58) Field of Classification Search
CPC .......... H02S 20/23; H02S 30/10; H02S 30/00; F16J 15/104; F24S 25/00; F24S 25/30; F24S 25/61; F24S 2025/015; F24S 2025/021; F24S 2025/6003; F24S 2025/804; F24S 2025/6004; F24S 2025/6005; Y02B 10/10; Y02B 10/20; Y02E 10/47; Y02E 10/50
See application file for complete search history.

(56) References Cited

U.S. PATENT DOCUMENTS

8,585,000 B2 * 11/2013 McPheeters ......... H01Q 1/1207
248/228.2
8,621,792 B2 * 1/2014 Zante ...................... F24S 25/33
52/173.3
(Continued)

*Primary Examiner* — Rodney Mintz
(74) *Attorney, Agent, or Firm* — Kramer Levin Naftalis & Frankel LLP (57) ABSTRACT

Single-piece hinged-clamps employed used in assemblies used to mount solar power modules to surface installation are disclosed. In some embodiments, a clamp with a right portion with a right notch having a right platform, a left portion with a left notch having a left platform, and a base portion with a flexible hinge is disclosed. The left portion also includes a threaded aperture extending downwardly from the left platform. In some embodiments, a method of securing a component with the clamp is disclosed in which a right member of a component is inserted into a right notch of a clamp, an applied force imparts movement of a left notch away from the right notch, and a buildup of potential energy in the flexible hinge during the application of the force moves the left notch in the opposite direction to engage the left member of the component.

19 Claims, 6 Drawing Sheets

Related U.S. Application Data division of application No. 17/070,351, filed on Oct. 14, 2020, now Pat. No. 11,463,040.

(60) Provisional application No. 62/988,677, filed on Mar. 12, 2020.

(51) Int. Cl.
*F24S 25/61* (2018.01)
*F24S 25/60* (2018.01)

(52) U.S. Cl.
CPC ......... *F24S 2025/804* (2018.05); *Y02B 10/10* (2013.01); *Y02B 10/20* (2013.01); *Y02E 10/47* (2013.01)

(56) References Cited

U.S. PATENT DOCUMENTS

| | | | | |
|---|---|---|---|---|
| 8,801,349 B2* | 8/2014 | McPheeters | ............ | F24S 25/10 |
| | | | | 411/84 |
| 9,051,950 B2* | 6/2015 | Jaffari | ............... | F16B 2/065 |
| 9,893,677 B1* | 2/2018 | Liu | ............... | H02S 30/00 |
| 10,205,418 B2* | 2/2019 | Nayar | ............... | F24S 25/33 |
| D853,954 S * | 7/2019 | McPheeters | ............ | F24S 25/33 |
| | | | | D13/102 |
| 10,469,022 B2* | 11/2019 | Kovacs | ............... | H02S 30/00 |
| 10,989,247 B2* | 4/2021 | Uppu | ............... | H02S 20/00 |
| 11,143,436 B1* | 10/2021 | Stephan | ............... | F24S 25/60 |
| 11,152,889 B1* | 10/2021 | Affentranger, Jr. | ...... | H02S 30/00 |
| 11,251,743 B2* | 2/2022 | Schuit | ............... | H02S 20/30 |
| 11,463,040 B2* | 10/2022 | Affentranger, Jr. | ...... | H02S 20/23 |
| 11,515,831 B2* | 11/2022 | Affentranger, Jr. | ...... | F16J 15/14 |
| 11,575,345 B2* | 2/2023 | Affentranger, Jr. | ...... | F24S 25/30 |
| 2008/0250614 A1* | 10/2008 | Zante | ............... | F16B 5/0657 |
| | | | | 24/542 |
| 2010/0146899 A1* | 6/2010 | Zante | ............... | F24S 25/33 |
| | | | | 52/584.1 |
| 2010/0282920 A1* | 11/2010 | McPheeters | ............ | F24S 25/61 |
| | | | | 248/72 |
| 2011/0283492 A1* | 11/2011 | McPheeters | ........ | E04D 13/1476 |
| | | | | 24/569 |
| 2011/0284708 A1* | 11/2011 | McPheeters | ............ | F24S 25/636 |
| | | | | 248/226.11 |
| 2012/0211252 A1* | 8/2012 | Turziano | ............... | F24S 25/61 |
| | | | | 174/6 |
| 2014/0042286 A1* | 2/2014 | Jaffari | ............... | F24S 25/30 |
| | | | | 248/316.4 |
| 2016/0111995 A1* | 4/2016 | Nayar | ............... | F24S 25/33 |
| | | | | 211/41.1 |
| 2019/0036474 A1* | 1/2019 | Schuit | ............... | H02S 20/23 |
| 2019/0273460 A1* | 9/2019 | Kovacs | ............... | H02S 20/23 |
| 2020/0116191 A1* | 4/2020 | Uppu | ............... | H02S 20/00 |
| 2021/0265939 A1* | 8/2021 | De Bie | ............... | E04D 11/007 |
| 2021/0285596 A1* | 9/2021 | Affentranger, Jr. | .... | F16M 13/02 |
| 2021/0285689 A1* | 9/2021 | Affentranger, Jr. | ...... | H02S 30/00 |
| 2022/0173692 A1* | 6/2022 | Schuit | ............... | H02S 20/30 |
| 2022/0221195 A1* | 7/2022 | Affentranger, Jr. | ...... | F24S 25/30 |
| 2022/0393636 A1* | 12/2022 | Affentranger, Jr. | ...... | H02S 30/00 |

* cited by examiner

FIG. 1D
(without release tab)

FIG. 1E
(with release tab)

FIG. 1F
(without release tab)

FIG. 1G
(with release tab)

SINGLE-PIECE HINGED CLAMP FOR TRACK MOUNTING ASSEMBLIES

CROSS-REFERENCE TO RELATED APPLICATION

This application is a continuation of U.S. patent application Ser. No. 17/889,957, filed on Aug. 17, 2022, which is a divisional application of U.S. patent application Ser. No. 17/070,351, filed on Oct. 14, 2020 and entitled "SINGLE-PIECE HINGED CLAMP FOR TRACK MOUNTED ASSEMBLIES," which claims the benefit of U.S. Provisional Patent Application Ser. No. 62/988,677, filed Mar. 12, 2020, both of which are hereby incorporated by reference in their entirety claims.

BACKGROUND

Building-mounted structures are typically secured to a building surface with one or more mounting assemblies. Such assemblies may include multiple components which coupled together to facilitate, for example, the ability to raise and lower track assemblies above an installation surface to which solar panel modules may be mounted during the installation of systems designed to generate solar power. One of these components could be a clamp which couples together two members of the mounting assembly in an arrangement desired for the installation. While clamps provide necessary functions to the installation process, each could be comprised of at least four separate components which an installer needs to handle simultaneously during the installation process: a threaded fastener, a nut, and two opposing members for providing a clamping force imparted by the tightening force applied to threaded fastener traversing through apertures of the opposing members to engage the nut with the proper amount of torque. During the installation of a solar power generation system, a significant delay can buildup due to the number of parts being fitted together.

SUMMARY

Embodiments of the inventive concepts disclosed herein are directed to a clamp assembly comprising a hinged-clamp, a fastener, and a spring. The use of this clamp assembly may improve installation time by reducing the number of parts with which the installer needs to handle and providing the installer a snapping feature to provide him/her an affirmative indication of that two structural members have been clamped together.

In one aspect, embodiments of the inventive concepts disclosed herein are directed to single-piece hinged-clamp. The hinged-clamp could include a base with a flexible hinge, a right sidewall with an aperture, a tapered right flange, a right platform, and a right notch formed by the tapered right flange and the right platform; a left sidewall extending from the flexible hinge and having a tapered left flange, a left platform, and a left notch formed by the tapered left flange and the left platform, where the left notch and right notch are collinear with each other; and a vertical member with a threaded aperture that extends between the left platform and the horizontal member.

In a further aspect, the single-piece hinged-clamp may be defined with a right portion with an aperture and a right notch having a right platform; a left portion with a left notch having a left platform collinear with the right platform, a horizontal member, and a threaded aperture in a vertical member extending between the left platform and the horizontal member; and a base portion extending between the right and left portions and comprised of a flexible hinge.

In a further aspect, embodiments of the inventive concepts disclosed herein are directed to a method for securing a component with the single-piece hinged-clamp.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
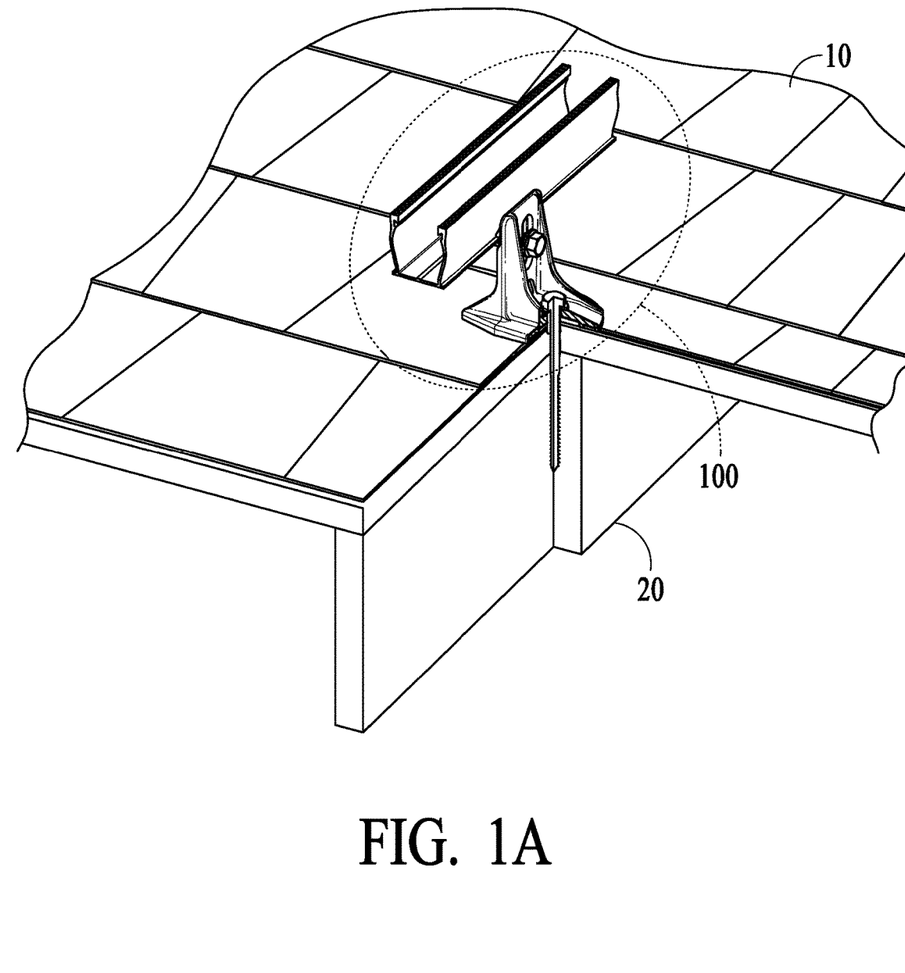
FIG. 1A illustrates a track assembly installed on a mounting or installation surface, in accordance with some embodiments.
Figure 1B:
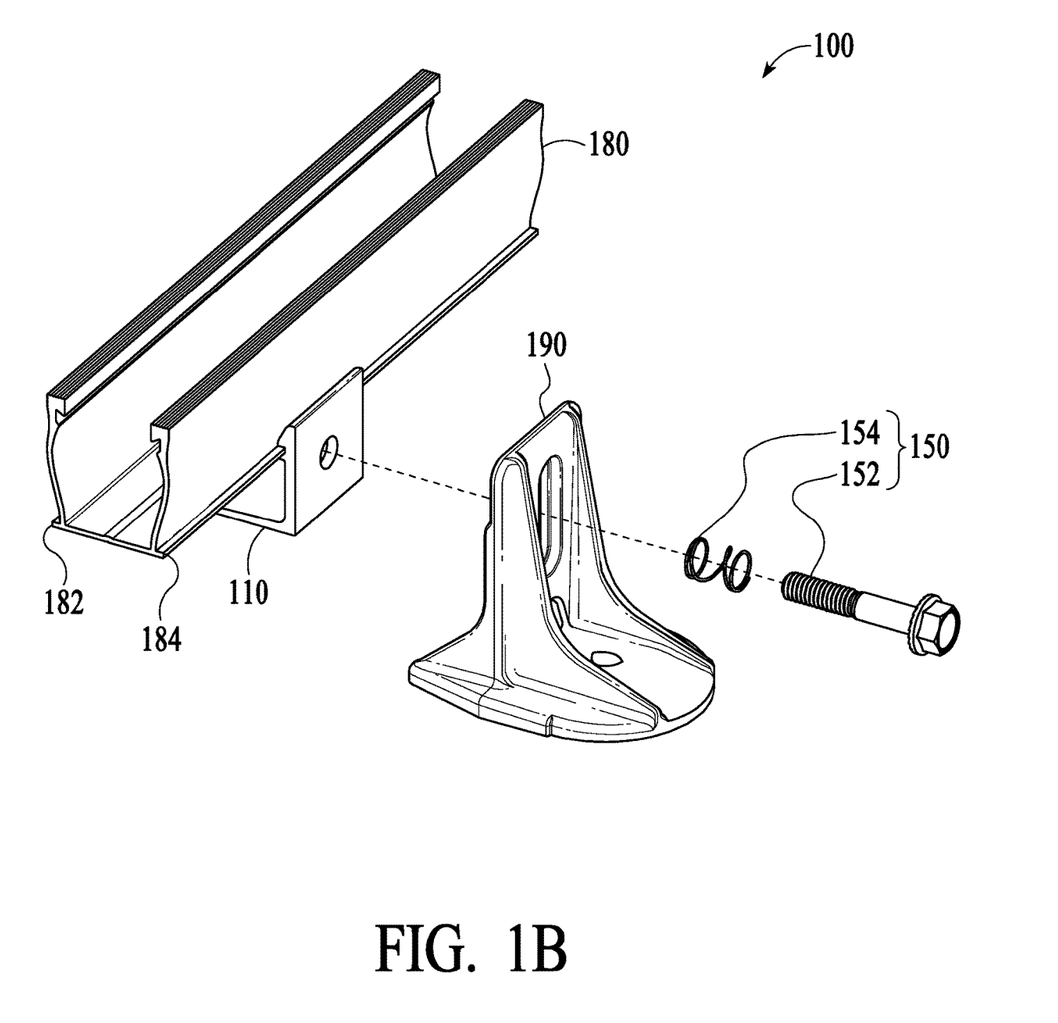
FIGS. 1B-1C illustrate top and bottom perspective views, respectively, of the track assembly, in FIGS. 1D-1E illustrate perspective views of a hinged-clamp, in accordance with some embodiments.
Figure 1C:
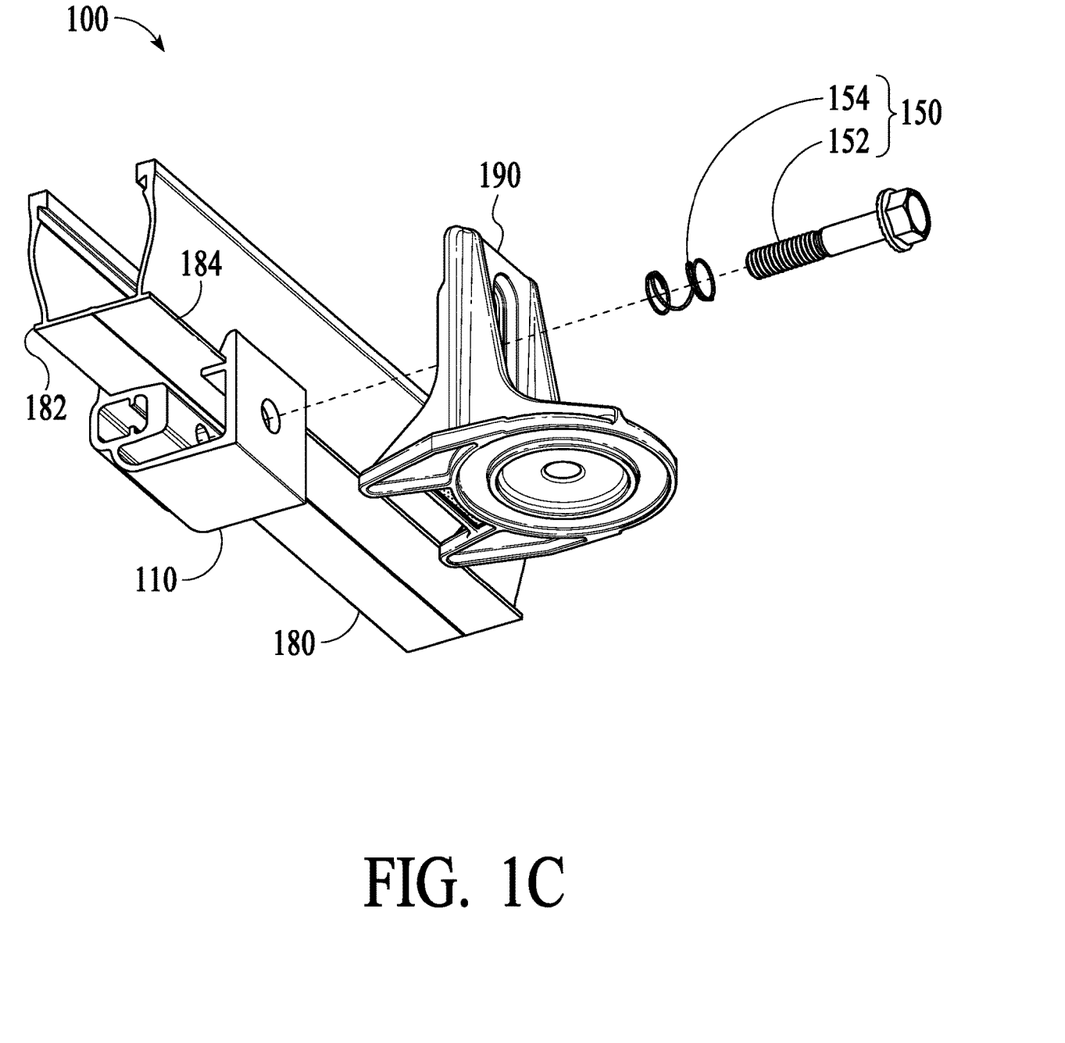
Figure 1D:
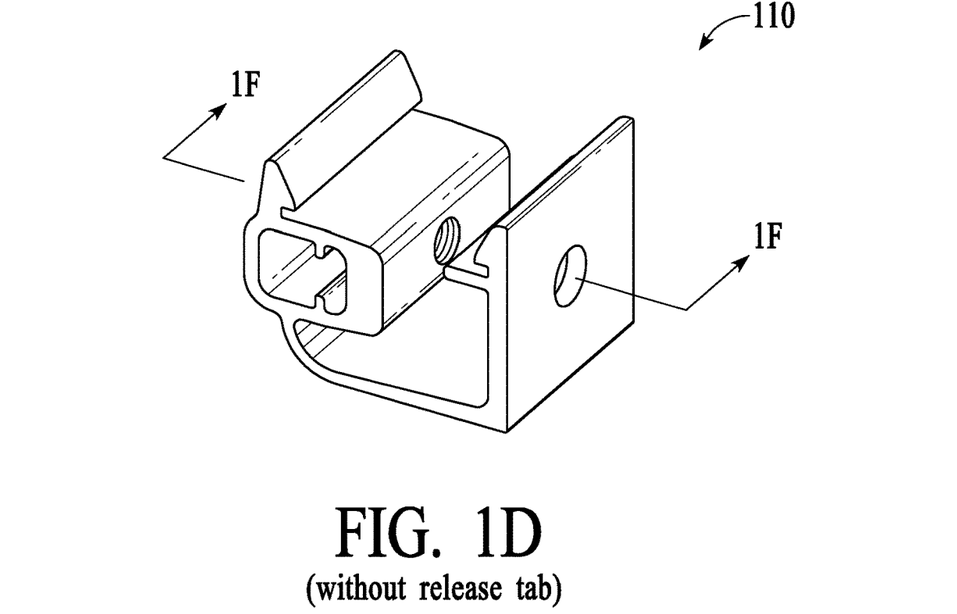
Figure 1E:
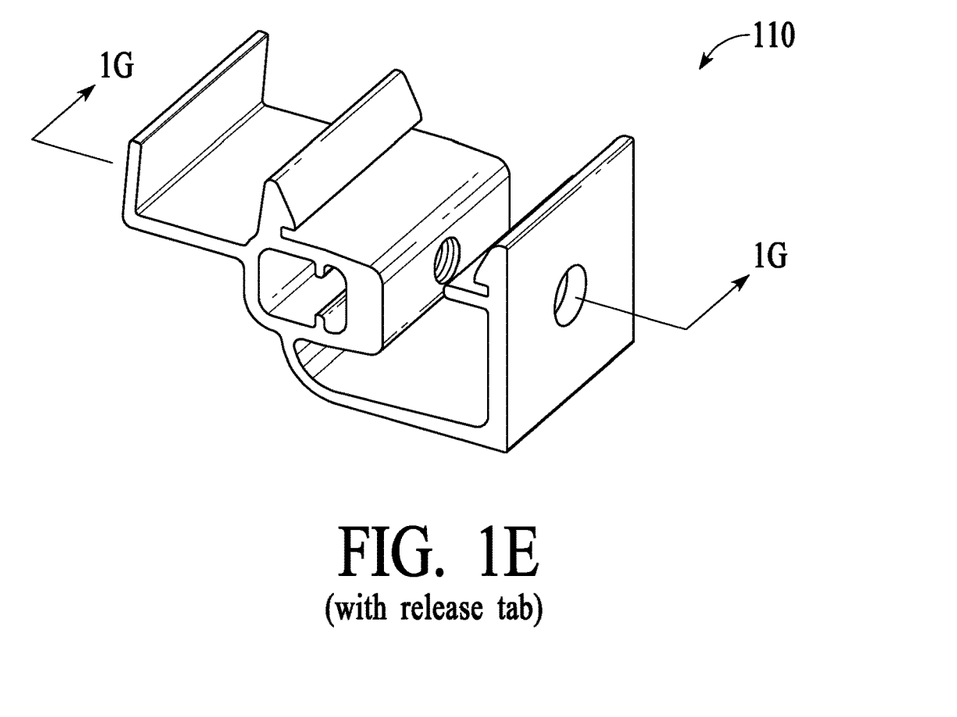
Figure 1F:
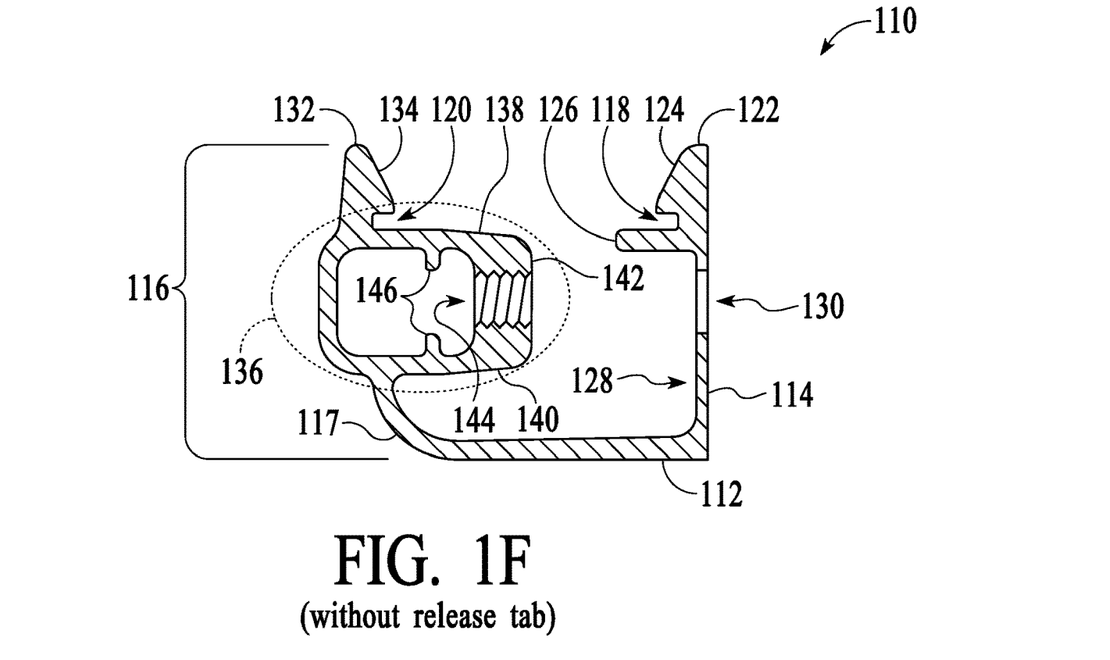
FIG. 1F illustrates a side, cross-sectional view of the hinged-clamp without a release tab, in accordance with some embodiments.

FIG. 1A illustrates track assembly 100 installed or mounted on installation surface 10 such as a roof and underlying support structure 20. FIGS. 1B-1C illustrate top and bottom perspective views of track assembly 100; FIGS. 1D-1E illustrate perspective views of hinged-clamp 110; FIG. 1F illustrates a cross-sectional side view of hinged-clamp 110; 1F illustrates a cross-sectional side view of hinged-clamp 110 with a release tab; FIG. 1F illustrate a side view of hinged-clamp 110; and 1I illustrates a side view of hinged-clamp 110 with a release tab.

Track assembly 100 includes a clamp assembly comprised of hinged-clamp 110 and fastening hardware 150 of fastener 152. In some embodiments, spring 154 could be employed. For the purpose of illustration and not of limitation, track 180 with right and left flanges 184 and 182, respectively, could be coupled to mount 190 configured to facilitate height-adjustability of track 180 to which solar panel modules may be coupled in a solar power generation system. Track 180 is disclosed in U.S. Design Pat. No. D853,954; mount 190 is disclosed in detail in U.S. Pat. No. 11,152,889, a reference which is incorporated herein in its entirety.

Hinged-clamp 110 includes base (or base portion) 112, right sidewall 114, left sidewall 116, and hinge 117 providing a curved or smooth transition from base 112 to left sidewall 116 which facilitates the insertion and removal of left and right flanges 184 and 182 of track 180 into right notch 118 and left notch 120, respectively, as track 180 is attached to and removed from clamp 110, respectively. In some embodiments, the curved or smooth transition facilitates flexibility with a downward swing and a simultaneous buildup of potential energy in hinge 117 during the clamping process as discussed below. A right portion of hinged-clamp 100 could include distal end 122 of right sidewall 114 includes right flange 124 tapering angularly downward and inwardly towards left sidewall 116. Also, the right portion could include right platform 126 extends inwardly and approximately perpendicularly away from inner surface 128 of right sidewall 114; together with tapered right flange 124, right platform 126 forms right notch 118. Right sidewall 114 includes aperture 130 through which fastener 152 extends when clamp 110 is coupled to mount 190.

A left portion of hinged-clamp 100 could include distal end 132 of left sidewall 116 includes left flange 134 tapering angularly downward and inwardly towards right sidewall 514. Also, the left portion could include stop structure 136 includes left platform 138, horizontal member 140, and vertical member 142 extending between left platform 138 and horizontal member 140; together with tapered left flange 134, left platform 138 forms left notch 120. Vertical member 142 includes threaded aperture 144 for receiving fastener 152 when clamp 110 is coupled to mount 190. Opposing vertical stops 146 extend towards each other from left platform 138 and horizontal member 140, providing a gap or space between stops 146.

Figure 1G:
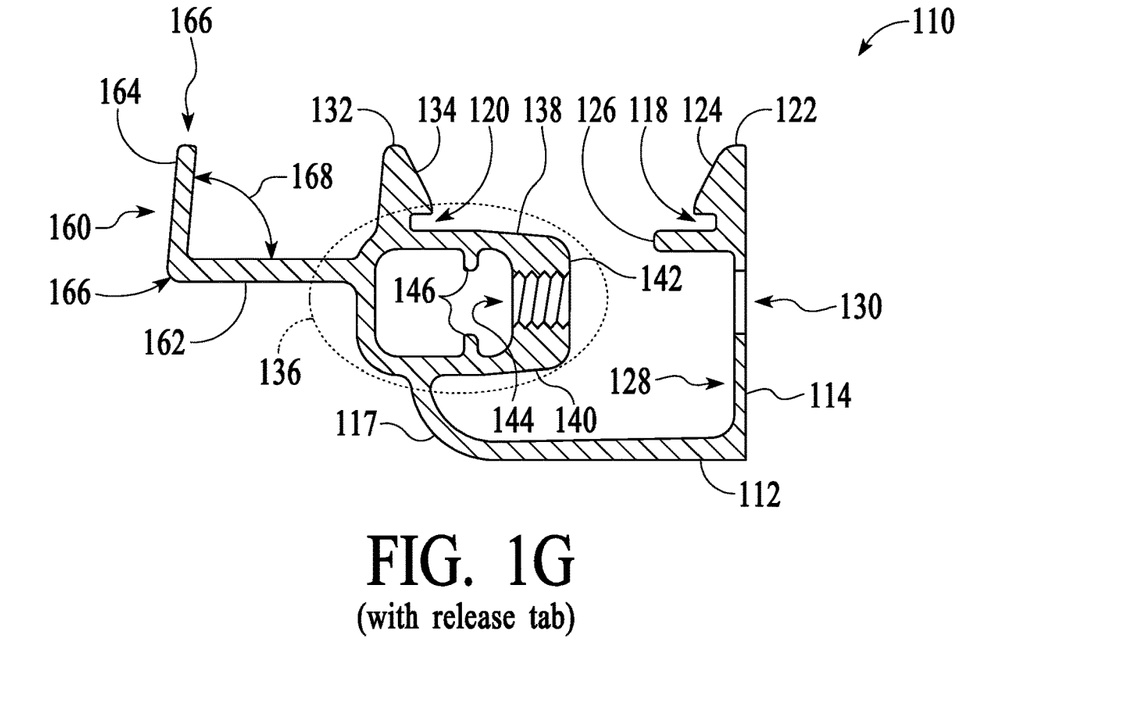
FIG. 1G illustrates a side, cross-sectional view of the hinged-clamp with a release tab, in accordance with some embodiments.

In some embodiments, stops 146 may provide a visually indication of a prescribed depth insertion of fastener 152 during a two-step process for attaching track 180 to mount 190. In a first step, mount 190 could be coupled to hinged-clamp 100 by inserting fastener 152 through aperture 130 and threadably engaging it with threaded aperture 144 in a tightening process until the tip of fastener 152 reaches stops 146 to provide a visual indication that fastener 152 has reached the prescribed depth insertion. At this point, hinged-clamp 100 is not fastened to mount 190 because the head of fastener 152 does not exert a compressive force against its mating vertical surface of mount 190. At this point, hinge 117 is capable of swinging downwardly.

In the second step, track 180 may be attached to hinged-clamp 100 as described below. Then, the tightening process continues until the head of fastener 152 exerts a compressive force upon its mating vertical surface of mount 190 until the prescribed, final torque has been reached. During this tightening process, the threads of the tip of fastener 152 could be forced between stops 146, especially in instances where fastener 152 is materially harder (e.g., steel) than stops 146 (e.g., aluminum). At this point, track 180 has become attached to mount 190 through hinged-clamp 100, and hinge 117 is no longer capable of swinging downward.

In some embodiments, track 180 could be attached to hinged-clamp 100 by inserting right flange 184 into right notch 118, pressing the tip of left flange 182 against left flange 184, and applying a downward force to track 180 as it is continually pressed against left flange 184, thereby imparting a downward travel to left flange 182, a horizontal or outward travel of left notch 120, and a downward swing of hinge 117 until left flange 182 reaches left notch 120, whereupon left notch 120 decisively snaps into its place around left flange 182 for a notchable engagement. The snapping action results from a release of potential energy built up in hinge 117 during the application of the force.

In some embodiments, track 180 could be attached to hinged-clamp 100 by inserting left flange 182 into left notch 120, pressing the tip of right flange 184 against right flange 184, and applying a downward force to track 180 as it is continually pressed against right flange 184, thereby imparting a horizontal or outward travel of left notch 120, a downward swing of hinge 117, and a compression of spring 154 until right flange 184 reaches right notch 118, whereupon right notch 118 decisively snaps into its place around right flange 184. The snapping action results from a release of potential energy built up in hinge 117 during the application of the force.

In some embodiments, the left portion of clamp 110 includes a release tab 160 comprising member 162 extending outwardly away from left sidewall 116; with member 162, an installer may press downward on it with his/her hand to impart a horizontal or outward travel of left notch 120, a downward swing of hinge 117, and a compression of spring 154. In some embodiments, a release tab 160 could include member 164 extending upwardly away from distal end 166 of member 162 to facilitate the use of release tool 170. In some embodiments, member 164 extends angularly to form an acute angle 168 as shown.

Figure 1H:
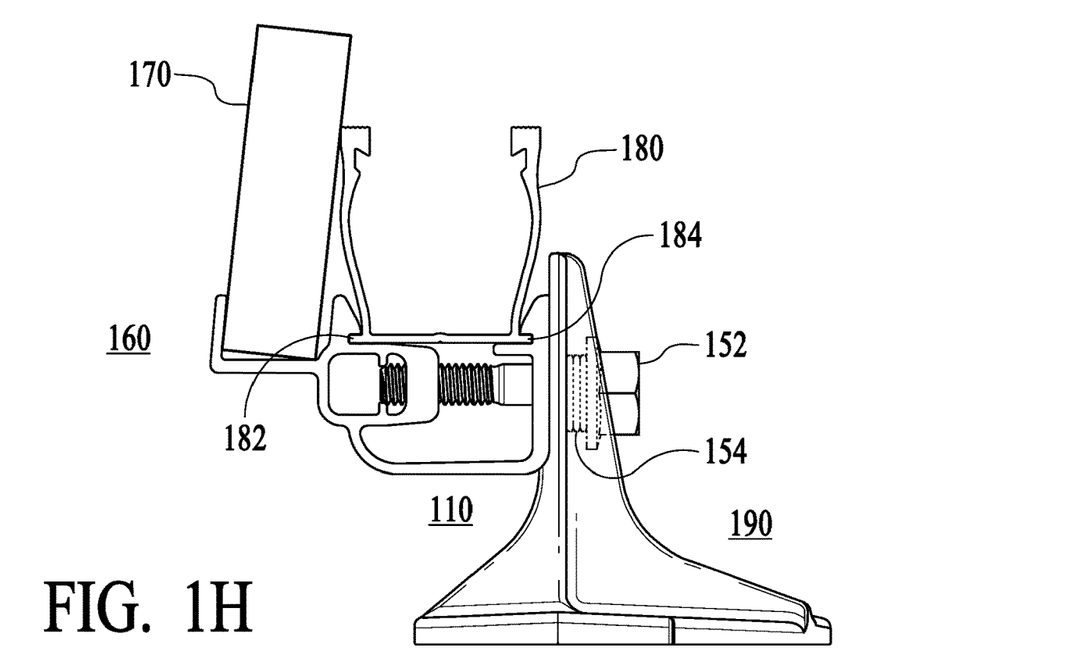
FIGS. 1H-1I illustrate side views of a release tool engaging a release tab of the hinged-clamp, in accordance with some embodiments.
Figure 1I:
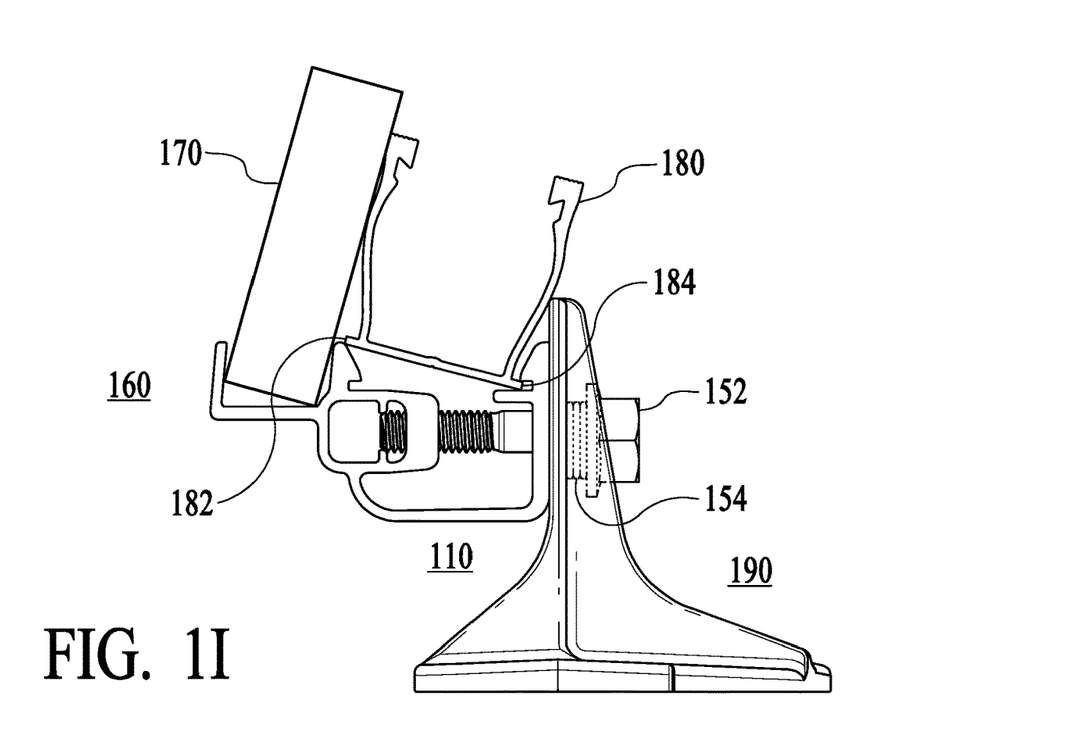

FIGS. 1H-1I illustrate two side views of release tool 170 positioned in release tab 560 and applied to the track as shown to enable the release of left flange 182 of clamp 110 from clamp 110 as shown. In some embodiments, release tool 170 could be any solid object such as, but not limited to, a screwdriver and socket wrench placed in release tab 160 and against track 180. To release track 180 from clamp 110, a force is applied to track 180 through release tool 170, imparting a downward swing of hinge 117, a compression of spring 154, and a horizontal or outward travel of left notch 120 until left flange 182 clears left notch 120. In some embodiments, release tool 170 may not be necessary; rather, a person could apply a downward force against release tab 560, imparting a downward swing of hinge 117, a compression of spring 154, and a horizontal or outward travel of left notch 120 until left flange 182 clears left notch 120.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A single-piece hinged-clamp, comprising:
   a first portion comprised of a first notch with a first platform and a first aperture below the first platform and located in a first vertical sidewall;
   a second portion comprised of a second notch with a second platform collinear with the first platform, and
   a third portion extending between the first portion and the second portion, and comprised of a horizontal member, a second aperture located in a second vertical sidewall configured for receiving fastening hardware extending through the first aperture, and a flexible hinge below the second aperture,
   wherein the hinged-clamp is a unitary structure of one-piece construction composed of a single piece of material.

2. The single-piece hinged-clamp of claim 1, wherein a downward swing of the flexible hinge imparts movement of the second notch away from the first notch.

3. The single-piece hinged-clamp of claim 1, wherein
the third portion is further comprised of a release tab, such that
a downward force applied to the release tab imparts a movement of the second notch away from the first notch and a downward swing to the hinge.

4. The single-piece hinged-clamp of claim 1, wherein the second aperture is threaded and configured for threadably engaging the fastening hardware extending through the first aperture.

5. The single-piece hinged-clamp of claim 1, wherein the first and second notches are configured to secure a component to an assembly mounted to an installation surface.

6. The single-piece hinged-clamp of claim 5, wherein the component is a track employed in an installation of a solar panel module and comprised of opposing flanges secured by the first and second notches.

7. The single-piece hinged-clamp of claim 1, wherein
the first portion is further comprised of a first flange which, together with the first platform, form the first notch, and
the second portion is further comprised of a second flange which, together with the second platform, form the second notch.

8. The single-piece hinged-clamp of claim 7, wherein
the first flange extends, from a distal end thereof, downward towards the first platform and inward towards the second portion, and
the second flange extends, from a distal end thereof, downward towards the second platform and inward towards the first portion.

9. The single-piece hinged-clamp of claim 7, wherein
the first flange extends, from a first distal end thereof, downward towards the first platform, and
the second flange extends, from a second distal end thereof, downward towards the second platform, where
the first flange is wider at the first platform than at the first distal end, and
the second flange is wider at the second platform than at the second distal end.

10. A method for securing a component with a single-piece hinged-clamp, comprising:
inserting a first member of a component into a first notch of a clamp;
applying a force to impart both a movement of a second notch of the clamp away from the first notch and a downward swing of a flexible hinge of the clamp; and
releasing the application of force when a second member of the component reaches the second notch, whereupon energy built up in the flexible hinge during the downward swing is released, thereby imparting movement of the second notch towards the first notch, whereby the second notch receives the second member to secure the clamp to the component,
wherein the clamp comprises the clamp of claim 1.

11. The method of claim 10, wherein
a first flange and a first platform form the first notch,
a second flange and a second platform form the second notch, and
the force is applied to a second flange.

12. The method of claim 10, wherein the force is applied to a release tab of the clamp extending away from the second notch.

13. The method of claim 10, wherein the component is employed in an assembly mounted to an installation surface.

14. The method of claim 10, wherein
the component is a track employed in the installation of a solar panel module, and
the first and second members are opposing flanges of the track.

15. A method for securing a component with a single-piece hinged-clamp, comprising:
inserting a first member of a component into a first notch of a clamp;
applying a force to impart both a movement of the first notch of the clamp away from a second notch thereof and a downward swing of a flexible hinge of the clamp; and
releasing the application of force when a second member of the component reaches the second notch, whereupon energy built up in the flexible hinge during the downward swing is released, thereby
imparting movement of the first notch towards the second notch, whereby
the second notch receives the second member to secure the clamp to the component, wherein
the clamp comprises the clamp of claim 1.

16. The method of claim 15, wherein
a first flange and a first platform form the first notch,
a second flange and a second platform form the second notch, and
the force is applied to a first flange.

17. The method of claim 15, wherein the force is applied to a release tab of the clamp extending away from the first notch.

18. The method of claim 15, wherein the component is employed in an assembly mounted to an installation surface.

19. The method of claim 15, wherein
the component is a track employed in the installation of a solar panel module, and
the first and second members are opposing flanges of the track.

* * * * *